United States Patent Office 3,476,835
Patented Nov. 4, 1969

3,476,835
MONO-, DI- OR TRI-PHOSPHITES OF CHLORO-
PHENYL AMINO ALCOHOLS
Ghislain Schwachhofer, Ecully, and Jacques Fritz, Lyon,
France, assignors to Progil S.A., a corporation of France
No Drawing. Filed June 3, 1966, Ser. No. 554,960
Claims priority, application France, June 4, 1965,
46,077, Patent 1,455,144
Int. Cl. C07f 9/12; C07c 91/06; C08k 1/60
U.S. Cl. 260—944                                5 Claims ABSTRACT OF THE DISCLOSURE
Phosphites having the formula:

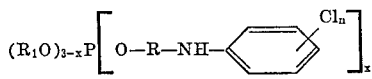

wherein R is an alkenyl group having 2 to 7 carbon atoms; $R_1$ is selected from the group consisting of alkyl, chloroalkyl, and phenyl; $n$ is 1 to 5; and $x$ is a number greater than zero not exceeding 3. The compounds are fireproofing agents for plastics.

---

The present invention concerns new organic phosphites and the process by which they are prepared and, also, plastic compositions containing the novel phosphites as fireproofing agents.

The products according to the invention are simple or mixed phosphites obtainable from N-chlorophenylamino alcohols and may be represented by the following general formula:

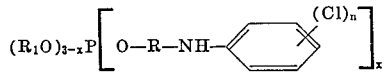

in which:

R represents a alkenyl group having 2 to 7 carbon atoms especially a linear or branched alkylene radical derived from the corresponding amino alcohols;
$R_1$ represents an alkyl, chloroalkyl or phenyl radical;
$n$ is a whole number between 1 and 5;
$x$ is a whole or fractional number less than 3 or equal to 3.

Among the phosphites which can be visualized, according to the invention, can be cited but not limited thereby, the phosphites of mono (or di-) phenyl (alkyl or chloroalkyl) and bis (or mono-) N-chlorophenylamino alcohols as well as the phosphites of tris (N-chlorophenyl-amino alcohols) in which the "N-chlorophenylamino alcohols" residues are issued from the following products:

N-pentachlorophenylethanolamine, N-pentachlorophenyl propanolamine, N-pentachlorophenylisopropanolamine, N-tetrachlorophenylethanolamine, N-tetrachlorophenylisobutanolamine, N-trichlorophenylethanolamine, N-trichlorophenylisopropanolamine, N - trichlorophenylpentanolamine, N-trichlorophenylheptanolamine, N - dichlorophenylethanolamine, N-dichlorophenylbutanolamine, N-dichlorophenylisopropanolamine, N - chlorophenylethanolamine, N-chlorophenylpentanolamine, N-chlorophenylisopropanolamine, etc.

These illustrative reactants may also be designated as chlorophenyliminoalkanols.

The phosphites of Formula I may be obtained by transesterification, according to known methods, of phosphites of the type $(R_1O)_3P$ by transesterification reactions with N-chlorophenylamino alcohols of formula:

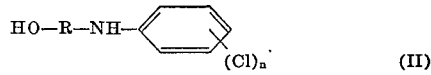

in which R and $n$ have the same signification as above.

These compounds themselves which constitute new intermediate products and are viewed as such in the present description (except the products for which $n=5$ in Formula II) are easily obtainable, with good yields, by condensation, under reflux heating, of polychlorobenzenes with an excess of the amino alcohol, corresponding to the desired product. They appear in the form of crystalline solids or colorless or slightly yellow oils.

The reaction of transesterification is effected by the heating of phosphite $P(OR_1)_3$ with the desired chlorophenylamino alcohol, at a temperature generally higher than 100° C.—preferably betweeen 120 and 150° C.—in the presence of small catalytic amounts of an alkaline catalyzer, such as for instance an alkaline hydroxide or alcoholate. The operation is generally done under atmospheric pressure, preferably in the presence of an inert current of gas.

Heating, which may last for one or several hours, is advantageously completed under vacuum in order to eliminate, by distillation, the liberated phenol corresponding to the stoichiometric quantity of the amino alcohol used. The phosphite formed is then recovered in a pure form, by fractional distillation or simple filtration of the reaction medium.

The type of phosphite obtained, after transesterification, is evidently determined by the molar proportions utilized for the starting phosphite and N-chlorophenylamino alcohol. When one uses, for instance, 1 mol of phosphite for 2 mols of the chlorophenylamino alcohol, one obtains a mixed phosphite of $R_1$ and bis (chlorophenylamino alcohol residue). If, on the contrary, these molar quantities are 1 for 3 respectively, one attains phosphite of tris (chlorophenylamino alcohol residue).

According to an alternative procedure, notably utilized in the case where the phosphite used as raw material is an alkyl or chloroalkyl phosphite, the process of transesterification can be substituted by a direct reaction between phosphorus trichloride and the N-chlorophenyl-amino alcohol (or rather a direct action of phosphorus trichloride on the N-chlorophenylamino alcohol can substitute for the process of transesterification. The reaction is effected at a temperature of 50 to 90° C. in an inert organic solvent such as, for example, an aromatic hydrocarbon such as benzene.

When one desires to prepare, for instance, a mixed phosphite containing chlorophenylamino alcohol residues and alkyl or chloroalkyl radicals, one reacts, under the conditions indicated above, 1 mol $PCl_3$ with 1 to 2 mols of a chlorophenylamino alcohol; then, when the evolution of HCl has ceased, one treats the resulting reactional mass with an adequate quantity of an epoxide such as, for instance, an alkylene oxide, at a temperature below 30° C.

The physical characteristic of the products of this invention is variable depending upon whether the phosphites are mixed or simple and depending upon the structure of the amino alcohol used as raw material, or reactants. Generally speaking, the novel phosphites are viscous liquids or resins with a low flow point (generally below 50° C.), colorless or very slightly colored yellow-orange.

The phosphites of Formula I can be advantageously used, like a large number of organic phosphites already known, in the stabilization of halogenated vinyl resins or as antioxidants for synthesis elastomers.

It was nevertheless found that the simple or mixed, phosphites of this invention, when incorporated in reagents susceptible of giving cellular plastic materials, may lead to the obtaining of rigid or pliable foamed, or cellular, plastics which are extremely resistant to the action of the flame. This property is particularly characteristic in the case of polyurethanes obtained by condensation of polyesters or polyethers with terminal hydroxy groupings with aliphatic and/or aromatic polyisocyanates. Such foamed, or cellular, plastics containing one or several of the above named phosphites as fireproofing agents and, in particular the rigid foamed plastics, become incombustible in the sense of U.S.A. norm ASTM D. 1692.

This phenomenon is especially of practical interest for the novel phosphites of Formula I surprisingly are compatible with most of the polycondensates having free OH groups usually used for the manufacture of polyurethanes and as the physical and mechanical properties of the porous bodies obtained are not appreciably affected by the presence of these phosphorus compounds.

The phosphite fireproofing agent, according to the invention, is introduced in the polycondensate (polyester or polyether) and one treats it, in a known manner, with an excess of polyisocyanate in order to make the NCO groups react on the active hydrogen of the N-chlorophenylamino alcohol phosphites.

The proportion of phosphite to be incorporated in the polycondensate may vary within large limits which are the function of the compatibility of the reagents between themselves and the effect and the extent of the fireproofing desired. It can be calculated in such a manner that the final foamed, or porous, plastic contains quantities of chlorine comprised, for instance, between 5 and 15% (by weight). Under these conditions, the retained phosphorus may vary generally between 0.2 and 5% (of the total weight of the foamed product) and the P/Cl relationship is found between 0.04 and 0.3.

The following examples, described purely for illustrative purpose, show how the invention can be practiced. Examples 1 to 11 illustrate the preparation and properties of a representative number of the novel phosphites. Examples 12–25 illustrate the application of these phosphites in the production of incombustible foamed, cellular, or porous polyurethanes.

EXAMPLE 1

Into a glass reactor, provided with an agitation device, a short Vigreux column and a refrigerant, was introduced 47.5 g. (0.15 mol) triphenylphosphite, 95 g. (0.30 ml) N-pentachlorophenylethanolamine and 100 mg. pulverent NaOH.

The reagents were heated for 3 hours at 120° C., in an oil bath under atmospheric pressure and in the presence of a nitrogen current. The pressure was reduced and the phenol formed was distilled off. In this way, 31.5 g. were obtained and residual byproducts were eliminated by heating for another 30 minutes at 170° C. under 8 mm. Hg.

The reaction product, a viscous and slightly turbid liquid was then filtered at an elevated temperature (90° C.) and 100 g. filtrate were obtained. It was a viscous and limpid liquid, the analysis of which corresponded to the mixed monophenyl, bis(N-pentachlorophenylethanolamine residue) phosphite; or phenyl, bis (pentachlorophenyliminoethyl) phosphite.

*Analysis.*—Calculated: P, 4.18%; Cl, 47.8%; M.W., 741. Found: P, 4.5; Cl, 47.3; M.W., 745. Acid index, 1.2; flow point, 21° C.

The N-pentachlorophenylethanolamine used as raw material is a crystalline solid melting around 77–79° C., described in U.S. Patent No. 2,829,164, Sept. 13, 1955.

EXAMPLE 2

In an installation identical to that used in Example 1, 337 g. (1.4 mol) N-trichlorophenylethanolamine, 145 g. (0.47 mol) triphenylphosphite and 500 mg. pulverent NaOH were heated for two hours at 122° C. Then any residual phenol was distilled off under subatmospheric pressure (60 mm. Hg) by continuing the heating for three hours. The amount of phenol recovered was 130 g. indicating the extent of the reaction. Other volatilizable ingredients were eliminated by heating for an additional hour at 180° C. at a pressure of 4 mm. Hg (distillate obtained 14 g.).

The reaction product obtained, after filtration at 80° C., weight 332 g. (yield: 96% tris phosphite of N-trichlorophenylethanolamine). It was a very viscous pale yellow liquid. This product may be designated tris-(trichorophenyliminoethyl) phosphite. An analysis of the product gave the following results.

*Analysis.*—Calculated: P, 4.13%; Cl, 42.63%. Found: P, 4.5%; Cl. 42.3%. Acid index, 0.5.

The N-trichlorophenylethanolamine, used as raw material, is considered to be a new product. It is a colorless oil, boiling at 193° C. under 10 mm. Hg, the chlorohydrate of which melts between 159 and 162° C. It was prepared by reflux heating 1,2,3,4-tetrachlorobenzene with an excess of monoethanolamine followed by elimination of the unreacted tetrachlorobenzene by distillation.

EXAMPLE 3

234 g. (0.75 mol) N-pentachlorophenylisopropanolamine, 116 g. (0.37 mol) triphenylphosphite and 300 mg. solid NaOH were heated for 1½ hours at a temperature of 121 to 127° C. Then, the reaction mass was subjected to distillation, under 45 mm. Hg for seven hours. 69.5 g. phenol were recovered. Residual phenol was eliminated by heating of the reaction mass for an additional thirty minutes at 180° C. under 7 mm. Hg.

After filtration at an elevated temperature (around 100° C.), 280 g. (yield: 97%) of a mixed monophenyl, bis phosphite of (N - pentachlorophenylisopropanolamine) were obtained. It was a resinous product with a clear color, melting at about 28° C., the analysis of which gave the following results.

*Analysis.*—Calculated: P, 4.02%; Cl, 45.99%; N, 3.62%. Found: P, 4.7%; Cl, 46.2%; N, 3.62%. Acid index, 0.3.

EXAMPLE 4

339.6 g. N-pentachlorophenylethanolamine, 113 g. triphenylphosphite and 150 mg. pounded NaOH were heated for three hours at 125° C. The phenol formed was eliminated by heating the reaction mass for five hours under 5 mm. Hg up to a temperature of 175° C. In this manner, 129 g. phenol were recovered.

After filtration of the resulting mass at an elevated temperature, 320 g. trisphosphite of N-pentachlorophenylethanolamine was obtained. It was a limpid resin with a molecular weight of about 900 and had a density of 1.72 and a flow point of about 45° C.

*Analysis.*—Calculated: P, 3.24%; Cl, 55.6%. Found: P, 3.8%; Cl, 54.8%; Acid index, 2.5.

EXAMPLE 5

155 g. triphenylphosphite were transesterified with 240 g. N-trichlorophenylethanolamine in the presence of 0.2 g. pounded NaOH. After four hours heating at 125–180° C. under reduced pressure, 96 g. phenol were distilled off and one obtained, by filtration at an elevated temperature, 296 g. of a mixed monophenyl, bis-(N-trichlorophenylethanolamine residue) phosphite. It was a pale yellow liquid, of low viscosity, the analysis of which gave the following results.

*Analysis.*—Calculated: p, 5.14%; Cl, 35.3%. Found: P, 5.75%; Cl, 35.7%. Acid index, 0.5.

EXAMPLE 6

A mixture of 129.5 g. N-pentachlorophenylisopropanolamine, 124 g. triphenylphosphite, and 100 mg. pulverulent NaOH were heated for one hour at 130° C. Then the formed phenol (44 g.) was eliminated by distillation under vacuum at temperatures up to 180° C.

After filtration of the reaction mass at 70° C., one obtains 195 g. mixed mono (N-pentachlorophenylisopropanolamine residue), bis(phenyl) phosphite. It is a viscous liquid with a clear color the analysis of which gave the following results.

*Analysis.*—Calculated: P, 5.73%; Cl, 32.83%. Found: P, 5.85%; Cl, 33.5%. Acid index, 0.9.

EXAMPLE 7

A mixture of 62 g. triphenylphosphite (0.2 mol), 62 g. N-pentachlorophenylethanolamine (0.2 mol) and 0.1 g. of pulverized NaOH was heated for three hours at 125° C.

After elimination of the phenol (15 g.) by heating up to 150° C. under 10 mm. Hg, followed by filtration of the reactional mass, one obtains 105 g. (yield 100%) mono (N-pentachlorophenylethanolamine residue), bis(phenyl) phosphite. It is a colorless oil the analysis of which gave the following results.

*Analysis.*—Calculated: P, 5.89%; Cl, 33.7%. Found: P, 6.43%; Cl, 36.3%. Acid index, 2.9.

EXAMPLE 8

A mixture of 170 g. N-trichlorophenylethanolamine, 219 g. triphenylphosphite and 0.1 g. pulverulent NaOH was subjected to condensation under nitrogen for three hours at 125° C. The reaction was completed by heating for an additional three hours at temperatures up to 180° C. under 8 mm. Hg to thereby eliminate 67.5 g. phenol formed.

After filtration of the resulting reaction mass at 50° C., one recuperates 309 g. mixed mono (N-trichlorophenylethanolamine residue), bis(phenyl) phosphite. It is a colorless liquid of low viscosity the analysis of which gave the following results.

*Analysis.*—Calculated: P, 6.79%; Cl, 23.3%. Found: P, 7.3%; Cl, 24.0%. Acid index, 0.5.

EXAMPLE 9

A mixture of 130 g. (0.417 mol) tri-chloropropyl phosphite and 200.5 g. (0.834 mol) N-trichlorophenylethanolamine was heated for two hours at from 100° C. up to 140° C. under 40 mm. Hg. In this manner, 79 g. propylene chlorhydrin (i.e., 100% of the theory) are distilled off. The filtered reaction product obtained, with a yielded of 99%, is a limpid liquid with little color, corresponding to bis (N-trichlorophenylethanolamine residue), monochloropropyl phosphite.

*Analysis*: P, 5.2%; Cl, 40.2%; N, 4.77%. Calculated: P, 5.13%; Cl, 41.17%; N, 4.64%.

EXAMPLE 10

One distills off 1.9 mol propylene chlorohydrin by heating for five hours under reduced pressure (around 110° C. then up to 150° C. at the end of the reaction) 1 mol trischloropropyl phosphite and 2 mols N-pentachlorophenylethanolamine. After filtering off traces of impurities at an elevated temperature, one obtains the mixed bis (N-pentachlorophenylethanolamine residue), monochloropropyl phosphite in the form of a viscous pale yellow liquid.

*Analysis*: P, 4.14%; Cl, 52.3%; N, 3.70%. Calculated: P, 4.18%; Cl, 52.66%; N, 3.77%.

EXAMPLE 11

During an interval of twenty minutes, 27.5 g. phosphorus trichloride (0.2 mol) was introduced into a glass flask, containing a solution of 129.5 g. N-pentachlorophenylisopropanolamine (0.4 mol) in 300 cm.³ benzene maintained at a temperature of 65° C. One observes an evolution of hydrochloric acid as a byproduct of the reaction, which after refluxing for one hour, equals 0.37 mol HCl. After the mass had cooled off, 15 g. of propylene oxide was added over a period of one hour, being careful to avoid temperatures in excess of 30° C. Next, the benzene was distilled off by heating the reaction mass under subatmospheric pressure at temperatures up to 100° C. One thereby obtains a yellow-clear, viscous liquid, made limpid by filtration, constituting 146 g. bis (N-pentachlorophenylisopropanolamine residue), monochloropropyl phosphite (yield 95%) having the following analysis.

*Analysis.*—Calculated: P, 4.0%; Cl, 50.6%; N, 3.64%. Found: P, 4.4%; Cl, 50.9%; N, 3.65%.

EXAMPLES 12–20

In order to have a standard of comparison, a rigid polyurethane resin was prepared from known reactants in a known way. More particularly, a rigid porous polyurethane was prepared from 112 parts of the well known polyurethane-forming reactant 4,4'-diisocyanodiphenylmethane, i.e., the isocyanate of P,P'-diaminophenyl methane, (obtainable in France under the tradename Desmodur 44V) and 100 parts of a conventional polyurethane-forming polyether reactant containing free OH functional groups (obtainable in France under the tradename Desmophen TMS). In addition, conventional adjuvants were included in parts-by-weight as follows:

| | |
|---|---|
| Monofluorothrichloromethane (Freon II) | 30.0 |
| Alkylbenzenesulfonate emulsifier (Additive SM) | 2.0 |
| Silicone oil (Additive SIF) | 0.5 |
| Tertiary amines: | |
| Desmorapid P.V. | 0.5 |
| Desmorapid P.P | 1.0 |

The standard composition was then converted into a rigid cellular, or foamed, polyurethane by well recognized and standard techniques. The resulting porous polyurethane was used as a standard of comparison (Example 12).

Also using basically standard techniques, eight samples of rigid polyurethane resins containing the phosphites hereof were prepared. Due to the previously mentioned compatability of the phosphites with the polyethers, the phosphites of the first 8 examples were mixed in variable proportions, with the polyether set out about to form 100 parts of a first mixture and the 34 parts of the adjuvants, set out above, were mixed with 112 parts of the diisocyanate set out above to form 146 parts of a second mixture. The two mixtures were then combined and converted into a porous polyurethane in conformity with conventional polyurethane resin-forming techniques. The proportions of phosphites were selected so that all samples of the polyurethane resin contained 10% by weight, of chlorine. In this way, the phosphorus content varied from 0.7 to 3.0% and the P/Cl ratio varied from 0.07 to 0.3.

The respective parts-by-weight (per 100 parts) of polyether and phosphite and the nature of the prosphite used are set out in Table I below as Examples 13–20.

TABLE I

| No. of example: | Parts (weight) of polyether | Parts (weight) of phosphite | Phosphite prepared according to above-mentioned Example No. |
|---|---|---|---|
| 13 | 41.5 | 58.5 | 7 |
| 14 | 55.2 | 44.8 | 1 |
| 15 | 61.4 | 38.6 | 4 |
| 16 | 11.8 | 88.2 | 8 |
| 17 | 40.0 | 60.0 | 5 |
| 18 | 49.8 | 50.2 | 2 |
| 19 | 35.5 | 64.5 | 6 |
| 20 | 54.1 | 45.9 | 3 |

The combustibility of the 9 examples of foamed polyurethane were evaluated in conformity with recognized U.S.A. standards of comparison (ASTM D.1962). Comparisons were made, also after a severt ageing test consisting of subjecting the samples to heating at 90° C. for 120 hours at a relative humidity of 100%.

The results obtained are given in Table II below:

TABLE II

| Standard ASTM-D.1692 | Numbers of the tests | | | | | | | | |
|---|---|---|---|---|---|---|---|---|---|
| | 12 | 13 | 14 | 15 | 16 | 17 | 18 | 19 | 20 |
| Combustibility [1]: | | | | | | | | | |
| (a) Before ageing | c | a | i | i | i | i | i | i | i |
| (b) After ageing | c | a | i | i | a | i | a | a | i |
| Dimensional variation during ageing, percent | 12 | 14 | 13 | 13 | 14 | 12 | 11 | 12 | 11 |

[1] c=Combustible.
i=Incombustible.
a=Autoextinguishable.

As can be seen, the phosphites hereof introduced structurally into the polyurethane type of foamed plastics impart superior fireproofing characterists thereto. In addition, it has been noted that the other characteristics of the porous polyurethanes, such as notably the density and mechanical properties, were all unaltered as compared to Example 12 which contained no phosphite.

EXAMPLES 21–24

In these examples, different novel phosphites and somewhat different rigid polyurethanes are evaluated.

As in Examples 12–20, standard formulating and standard reaction procedures are followed.

A standard formulation and a standard rigid polyurethane foamed plastic (Example 21) were prepared as in Examples 12–20, except that 92–94 parts of the same polyisocyanate were used per 100 parts of a polyether containing free hydroxy OH functional group, namely a polyether, available in France under the trademark Desmophen TMS.

Putting it another way, the adjuvants used in Examples 21–24 were the same as those in Examples 12–20 and they were used in the same parts-by-weight, but the standard rigid polyurethane resin was made from 100 parts of the different polyether, set out above, per 92 to 94 parts of the diisocyanate of Examples 12–20.

In the preparation of the samples for evaluation in a pilot plant (Examples 22–24), in addition to the 34 parts of adjuvants, 100 parts of the polyether, together with the novel phosphites, were used per 110 parts of the diisocyanate. It will be observed Examples 22–24 use relatively less phosphite than Examples 13–20.

The polyether and phosphite content of Examples 22–24 are set out below in Table III.

TABLE III

| | Parts (weight) of polyether | Parts (weight) of phosphite | Phosphite prepared according to above-mentioned Example No. |
|---|---|---|---|
| No. of example: | | | |
| 22 | 62.5 | 37.5 | 9 |
| 23 | 70.5 | 29.5 | 10 |
| 24 | 69.5 | 30.5 | 11 |

The above-mentioned quantities of phosphites were calculated in such a manner that all the samples of the final foamed, or porous, bodies contained 8% by weight of chlorine. Under these conditions, the content of phosphorus varied between 0.63 and 1.0% and the resulting P/Cl relationships fell between 0.08 and 0.13.

The relative combustibility of samples 21 and 22 to 24 was then determined by using U.S.A. standard procedure, as set out under ASTM D. 1692–59T. These evaluations were made after a severe ageing test consisting of subjecting the samples to a heating at 90% C. for 120 hours in a relative humidity of 100%.

The results obtained are given in Table IV below:

TABLE IV

| Norm ASTM D. 1692 | Numbers of the tests | | | |
|---|---|---|---|---|
| | 21 | 22 | 23 | 24 |
| Combustibility [1]: | | | | |
| After ageing | c | a | a | a |
| Dimensional Variation during ageing | +7 | −12 | −4.5 | −9 |

[1] As in table II.

As can be seen from these results, the incorporation in a structural way of the phosphites of Examples 9–11 into a rigid porous polyurethane, also, leads to the imparting of very good fire-proofing properties.

EXAMPLE 25

Fireproofing tests on flexible polyurethanes, effected under the same conditions as those described in Examples 21–24, and starting with the same compositions of reagents except that one utilized, as the polyether, Desmophen 3400 (instead of TMS) and, as the diisocyanate, toluene diisocyanate (80% isomer 2, 6 and 20% isomer 2, 4) instead of 4,4-dicyanodiphenyl methane, have shown that the 3 monochloropropyl, bis (polychlorophenyl alkanolamine) phosphites, described in above Examples 9–11 as well as the phenyl, (N-pentachlorophenylalkanolamine) phosphites of Examples 1, 3, 4, 6, and 7, led to the obtaining of autoextinguishable flexible porous polyurethane articles. In fact, when a lighted match was applied to the polyurethanes, containing the phosphites mentioned in this example, the polyurethanes initially started to burn but then went out. On the other hand, the standard sample of polyurethane (containing no phosphites) was totally reduced to ashes.

It will be understood the preceding description and examples have been included for illustrative purposes and that those skilled in the art can make variations in the details disclosed therein without departing from the spirit or the scope of the invention.

In the basically known transesterification reactions hereof, it will be apparent alkaline compounds other than the alkali metal hydroxides, used for illustrative purpose, may be used in the transesterification reactions. Obviously, the alkali metal hydroxides are readily available and inexpensive so they are used out of economic considerations. Also, since the examples are primarily concerned with producing fireproofing agents, it is ayppparent that the divalent hydrocarbon group appearing in the "N-chlorophenylaminoalcohols," i.e., chlorophenyliminoalcohols, reactants used in making the novel phosphites should be of as low molecular weight as conveniently possible in order to introduce a high percentage of N and P. On the other hand, since the OH of the alcohol is the functional group in the formation of the phosphites, it is apparent other divalent hydrocarbon residues both saturated and unsaturated, such as allyl, could be present including those containing more than the 5 to 6 carbon atoms shown in the illustrative examples. For instance, other low molecular weight hydrocarbon residues of up to 8 carbon atoms or even higher molecular weight hydrocarbon residues might be present. Actually higher molecular divalent hydrocarbon residues might be advantageous when the novel phosphites are used for other purposes as, for instance, as antioxidants or stabilizers as previously mentioned herein.

What is claimed is:
1. Phosphites having the formula:

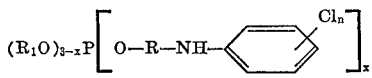

wherein R is an alkenyl group having 2 to 7 carbon atoms; $R_1$ is selected from the group consisting of chloroloweralkyl and phenyl; $n$ is 1 to 5; and $x$ is a number greater than zero not exceeding 3.

2. The compounds of claim 1, wherein $R_1$ is chloropropyl.

3. The compounds of claim 1, wherein $n$ is 1 to 4.

4. The compounds of claim 1, wherein $n$ is 5.

5. The compounds of claim 1, wherein $x$ is 1 to 3.

References Cited

UNITED STATES PATENTS 3,172,871  3/1965  Malz et al. _____ 260—944 XR

CHARLES B. PARKER, Primary Examiner

A. H. SUTTO, Assistant Examiner

U.S. Cl. X.R.

260—2.5, 45.9, 573, 970, 982